United States Patent
Nakamura et al.

(10) Patent No.: US 10,190,678 B2
(45) Date of Patent: Jan. 29, 2019

(54) TWIN-CLUTCH TRANSMISSION

(71) Applicant: HONDA MOTOR CO., LTD., Tokyo (JP)

(72) Inventors: Kazuhiko Nakamura, Wako (JP); Hiroyuki Kojima, Wako (JP); Yoshihisa Kanno, Wako (JP); Hiroshi Takamoto, Wako (JP); Yoshiaki Tsukada, Wako (JP); Takashi Ozeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 541 days.

(21) Appl. No.: 15/071,431

(22) Filed: Mar. 16, 2016

(65) Prior Publication Data

US 2016/0290497 A1 Oct. 6, 2016

(30) Foreign Application Priority Data

Mar. 31, 2015 (JP) ................................. 2015-073050

(51) Int. Cl.
*F16H 61/02* (2006.01)
*F16H 61/04* (2006.01)
(Continued)

(52) U.S. Cl.
CPC ......... *F16H 61/0213* (2013.01); *F16H 61/04* (2013.01); *F16H 3/006* (2013.01); *F16H 3/091* (2013.01); *F16H 59/38* (2013.01); *F16H 61/688* (2013.01); *F16H 63/18* (2013.01); *F16H 2061/0474* (2013.01); *F16H 2063/025* (2013.01)

(58) Field of Classification Search
None
See application file for complete search history.

(56) References Cited

U.S. PATENT DOCUMENTS

2005/0029068 A1* 2/2005 Koenig ................... F16H 61/30
192/48.91
2005/0107214 A1* 5/2005 Koenig ................... F16H 61/12
477/174
(Continued)

FOREIGN PATENT DOCUMENTS

JP 2004-125112 A 4/2004
JP 2008-215555 A 9/2008

*Primary Examiner* — Justin Holmes
(74) *Attorney, Agent, or Firm* — Birch, Stewart, Kolasch & Birch, LLP

(57) ABSTRACT

A twin-clutch transmission that can always effectively reduce gear shift shock and a collision sound even under the existence of variation attributed to component tolerance and change over the ages attributed to wear. A twin-clutch transmission calculates a rotational speed difference (|Na−Nb|) between an odd-stage main shaft rotational speed (Na) and an even-stage main shaft rotational speed (Nb) and learns synchronization start gear shift drive displacement (θs) detected by a gear shift drive displacement detecting unit at the timing at which the rotational speed difference (|Na−Nb|) reaches a predetermined synchronization start determination rotational speed difference (Ds) from gear shift start. The twin-clutch transmission controls an actuator on the basis of the learned synchronization start gear shift drive displacement (θs).

14 Claims, 11 Drawing Sheets

(51) Int. Cl.
  *F16H 3/00* (2006.01)
  *F16H 3/091* (2006.01)
  *F16H 63/18* (2006.01)
  *F16H 63/02* (2006.01)
  *F16H 59/38* (2006.01)
  *F16H 61/688* (2006.01)

(56) References Cited

U.S. PATENT DOCUMENTS

2007/0265137 A1* 11/2007 Jiang .................... B60W 10/02
                                                  477/176
2015/0072831 A1*  3/2015 Sakata ................... B60K 6/48
                                                  477/5
2015/0151734 A1*  6/2015 Yamamoto .............. B60K 6/48
                                                  477/5

* cited by examiner

TWIN-CLUTCH TRANSMISSION

CROSS-REFERENCE TO RELATED APPLICATIONS

The present application claims priority under 35 USC 119 to Japanese Patent Application No. 2015-073050 filed Mar. 31, 2015 the entire contents of which are hereby incorporated by reference.

BACKGROUND OF THE INVENTION

1. Field of the Invention

The present invention relates to a twin-clutch transmission including synchromesh.

2. Description of Background Art

As a twin-clutch transmission, the following one is known wherein transmission gears are pivotally supported by two coaxial main shafts and transmission gears are pivotally supported by a countershaft constantly mesh with each other corresponding to each transmission gear ratio. A sleeve is pivotally supported by at least one rotating shaft among the two main shafts and the countershaft in such a manner as to be restricted from relative rotation and be movable in the axial direction. The transmission gear is pivotally supported by the rotating shaft relatively rotatably and have sleeve teeth and gear dog teeth that mesh with each other. When the sleeve teeth mesh with the gear dog teeth due to the movement of the sleeve and a tarcome into shift stage is formed, two clutches are alternately connected and disconnected. This allows smooth gear shift to the tarcome into transmission gear ratio without interruption of power transmission of an internal combustion engine. See, for example, Japanese Patent Laid-Open No. 2008-215555.

Furthermore, among transmissions are ones including synchromesh. See, for example, Japanese Patent Laid-Open No. 2004-125112. In the synchromesh disclosed Japanese Patent Laid-Open No. 2004-125112, ring gear teeth (ring teeth) formed in an outer ring (synchronizer ring) of a blocking ring intervene between gear teeth (gear dog teeth) formed in a first transmission gear are pivotally supported relatively rotatably by a rotating shaft that is a main shaft or a countershaft and spline teeth (sleeve teeth) formed in a sleeve (synchronizer sleeve) pivotally supported by the rotating shaft in such a manner so as to be restricted from relative rotation and be movable in the axial direction. At the time of gear shift, due to the movement of the synchronizer sleeve, the sleeve teeth come into contact with and mesh with the ring teeth and then come into contact with and mesh with the gear dog teeth. Therefore, the synchronizer sleeve (and the rotating shaft) and the first transmission gear are joined to each other while synchronizing with each other.

A transmission is desired, that is obtained, by incorporating synchromesh like that disclosed in Japanese Patent Laid-Open No. 2004-125112 into a twin-clutch transmission in which two main shafts are coaxially formed with clutches each provided on the input side of a respective one of the main shafts being alternately connected and disconnected. See, for example, Japanese Patent Laid-Open No. 2008-215555.

In the twin-clutch transmission including such synchromesh, when the sleeve teeth comes into contact with the ring teeth of the blocking ring due to the movement of the synchronizer sleeve of the synchromesh, gear shift shock and a collision sound caused by the collision of them with each other need to be suppressed.

For this purpose, the movement speed of the synchronizer sleeve needs to be reduced immediately before the sleeve teeth come into contact with the ring teeth due to the movement of the synchronizer sleeve of the synchromesh. However, the movement position of the sleeve at which the sleeve teeth come into contact with the ring teeth involves a variation due to component tolerance. In addition, the sleeve teeth and the ring teeth also involve the progression of wear attributed to slide contact and change over the ages. Therefore, the movement position of the sleeve at which the sleeve teeth come into contact with the ring teeth also changes, i.e. the timing at which the sleeve teeth come into contact with the ring teeth also changes. Thus, the timing of the reduction of the movement speed of the synchronizer sleeve gradually deviates from the optimum timing and it becomes impossible to effectively reduce the gear shift shock and the collision sound.

SUMMARY AND OBJECTS OF THE INVENTION

The present invention is made in view of such a point and an object of an embodiment of the present invention is to provide a twin-clutch transmission including synchromesh that can always effectively reduce gear shift shock and a collision sound even under the existence of a variation attributed to component tolerance and change over the ages attributed to wear.

In order to achieve the above-described object, according to an embodiment of the present invention, there is provided a twin-clutch transmission including:

a gear change mechanism in which an odd-stage main shaft that pivotally supports drive-side transmission gears of odd stages and an even-stage main shaft that pivotally supports drive-side transmission gears of even stages are disposed on a same axis line, and a countershaft for pivotally supporting driven-side transmission gears that individually constantly mesh with the drive-side transmission gears is disposed in parallel to the odd-stage main shaft and the even-stage main shaft, a twin clutch to which power is transmitted through selective connection of an odd-stage clutch that connects and disconnects power transmission between a crankshaft of an internal combustion engine and the odd-stage main shaft and an even-stage clutch that connects and disconnects power transmission between the crankshaft and the even-stage main shaft, and synchromesh in which ring teeth formed in a synchronizer ring are interposed between gear dog teeth formed in a first transmission gear pivotally supported relatively rotatably by at least one rotating shaft among the odd-stage main shaft, the even-stage main shaft, and the countershaft and sleeve teeth formed in a synchronizer sleeve that is a second transmission gear or a moving sleeve pivotally supported by the rotating shaft in such a manner so as to be restricted from relative rotation and be movable in the axial direction, and the sleeve teeth come into contact with and mesh with the ring teeth and then come into contact with and mesh with the gear dog teeth due to movement of the synchronizer sleeve and thereby the synchronizer sleeve and the first transmission gear are joined to each other while synchronizing with each other.

The twin-clutch transmission is characterized by including:

a gear shift drive mechanism in which driving of an actuator is transmitted for movement of the synchronizer sleeve via a plurality of drive transmitting elements sequentially, a gear shift drive displacement detecting unit that detects gear shift drive displacement of the drive transmitting element of the gear shift drive mechanism, an odd-stage main shaft rotational speed detecting unit that detects rotational speed of the odd-stage main shaft, an even-stage main shaft rotational speed detecting unit that detects rotational speed of the even-stage main shaft, and a control unit that executes calculation processing on a basis of an odd-stage main shaft rotational speed detected by the odd-stage main shaft rotational speed detecting unit, an even-stage main shaft rotational speed detected by the even-stage main shaft rotational speed detecting unit, and gear shift drive displacement detected by the gear shift drive displacement detecting unit, and controls the actuator.

The control unit calculates a rotational speed difference between the odd-stage main shaft rotational speed and the even-stage main shaft rotational speed and learns synchronization start gear shift drive displacement detected by the gear shift drive displacement detecting unit at a timing at which the rotational speed difference reaches a predetermined synchronization start determination rotational speed difference from gear shift start, and the control unit controls the actuator on a basis of the learned synchronization start gear shift drive displacement.

According to an embodiment of the present invention, the control unit learns the synchronization start gear shift drive displacement detected by the gear shift drive displacement detecting unit at the timing at which the rotational speed difference between the odd-stage main shaft rotational speed and the even-stage main shaft rotational speed reaches the predetermined synchronization start determination rotational speed difference with which it can be determined that the sleeve teeth of the synchromesh have come into contact with the ring teeth. Furthermore, the control unit controls the actuator on the basis of the learned synchronization start gear shift drive displacement. Due to this, a constant speed reduction control of the synchronizer sleeve can be carried out at favorable timing to effectively reduce the gear shift shock and the collision sound without being affected by variation attributed to component tolerance and wear.

According to an embodiment of the present invention, the control unit does not carry out learning of the synchronization start gear shift drive displacement if the rotational speed difference is equal to or larger than a predetermined drag determination rotational speed difference at the time of gear shift start.

According to an embodiment of the present invention, when, at the time of gear shift start, the rotational speed difference between the odd-stage main shaft rotational speed and the even-stage main shaft rotational speed is equal to or larger than the predetermined drag determination rotational speed difference with which it can be determined that the odd-stage main shaft and the even-stage main shaft are in a drag state, learning of the synchronization start gear shift drive displacement is not carried out and erroneous control of the actuator is prevented because the odd-stage main shaft and the even-stage main shaft are not in the drag state before gear shift and thus the present state is not the state in which the synchronization start gear shift drive displacement can be learned.

According to an embodiment of the present invention, the gear shift drive mechanism includes, as the drive transmitting elements, a shift spindle that rotates by driving of the actuator, a shift drum that rotates by rotation of the shift spindle, and a shift fork that is guided by a lead groove of the shift drum to move in the axial direction by rotation of the shift drum, the gear shift drive mechanism is a mechanism in which the shift fork engages with the synchronizer sleeve and moves the synchronizer sleeve, the gear shift drive displacement detecting unit is a shift spindle rotational position detecting unit that detects a rotational position of the shift spindle, and a shift spindle rotational position detected by the shift spindle rotational position detecting unit is employed as the gear shift drive displacement.

According to an embodiment of the present invention, the shift spindle rotational position detected by the shift spindle rotational position detecting unit is employed as the gear shift drive displacement. Thus, the synchronization start rotational position of the shift spindle detected at the timing at which the rotational speed difference reaches the predetermined synchronization start determination rotational speed difference can be detected as the synchronization start timing at which the sleeve teeth come into contact with the ring teeth.

According to an embodiment of the present invention, the gear shift drive mechanism includes, as the drive transmitting elements, a shift spindle that rotates by driving of the actuator, a shift drum that rotates by rotation of the shift spindle, and a shift fork that is guided by a lead groove of the shift drum to move in the axial direction by rotation of the shift drum, the gear shift drive mechanism is a mechanism in which the shift fork engages with the synchronizer sleeve and moves the synchronizer sleeve, the gear shift drive displacement detecting unit is a shift drum rotational position detecting unit that detects a rotational position of the shift drum, and a shift drum rotational position detected by the shift drum rotational position detecting unit is employed as the gear shift drive displacement.

According to an embodiment of the present invention, the shift drum rotational position detected by the shift drum rotational position detecting unit is employed as the gear shift drive displacement. Thus, the synchronization start rotational position of the shift drum detected at the timing at which the rotational speed difference reaches the predetermined synchronization start determination rotational speed difference can be detected as the synchronization start timing at which the sleeve teeth come into contact with the ring teeth.

According to an embodiment of the present invention, the gear shift drive mechanism includes, as the drive transmitting elements, a shift spindle that rotates by driving of the actuator, a shift drum that rotates by rotation of the shift spindle, and a shift fork that is guided by a lead groove of the shift drum to move in the axial direction by rotation of the shift drum, the gear shift drive mechanism is a mechanism in which the shift fork engages with the synchronizer sleeve and moves the synchronizer sleeve, the gear shift drive displacement detecting unit is a shift fork movement position detecting unit that detects a movement position of the shift fork, and a shift fork movement position detected by the shift fork movement position detecting unit is employed as the gear shift drive displacement.

According to an embodiment of the present invention, the shift fork movement position detected by the shift fork movement position detecting unit is employed as the gear shift drive displacement. Thus, the synchronization start movement position of the shift fork detected at the timing at which the rotational speed difference reaches the predetermined synchronization start determination rotational speed difference can be detected as the synchronization start timing at which the sleeve teeth come into contact with the ring teeth.

According to an embodiment of the present invention, the twin-clutch transmission includes a plurality of pieces of the synchromesh, and the control unit carries out control of the actuator regarding synchronization operation of each of the synchromesh.

According to an embodiment of the present invention, the control of the actuator is carried out regarding the synchronization operation of each of the synchromesh included in the twin-clutch transmission. Thus, regarding each synchromesh, constantly the gear shift shock and the collision sound can be effectively reduced without the influence of a variation attributed to component tolerance and the wear of the sleeve teeth and so forth.

In the above-described configuration, the twin-clutch transmission includes a plurality of pieces of the synchromesh, and the control unit carries out a control of the actuator regarding a respective synchronization operation in shift-up and a synchronization operation in shift-down about each of the synchromesh.

According to an embodiment of the present invention, the control of the actuator is carried out regarding the respective synchronization operation in a shift-up and the synchronization operation in a shift-down about each synchromesh. Thus, in the shift-up and in the shift-down with each synchromesh, constantly the gear shift shock and the collision sound can be effectively reduced without the influence of variation attributed to component tolerance and the wear of the sleeve teeth and so forth.

According to an embodiment of the present invention, the control unit learns the synchronization start gear shift drive displacement detected by the gear shift drive displacement detecting unit at the timing at which the rotational speed difference between the odd-stage main shaft rotational speed and the even-stage main shaft rotational speed reaches the predetermined synchronization start determination rotational speed difference with which it can determined that the sleeve teeth of the synchromesh have come into contact with the ring teeth. Furthermore, the control unit controls the actuator by employing the learned synchronization start gear shift drive displacement as the tarcome into gear shift drive displacement. Due to this, a constant speed reduction control of the synchronizer sleeve can be carried out at favorable timing to effectively reduce the gear shift shock and the collision sound without being affected by variation attributed to component tolerance and the wear of the sleeve teeth and so forth.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment according to the present invention will be described below on the basis of FIGS. 1 to 11.

Figure 1:
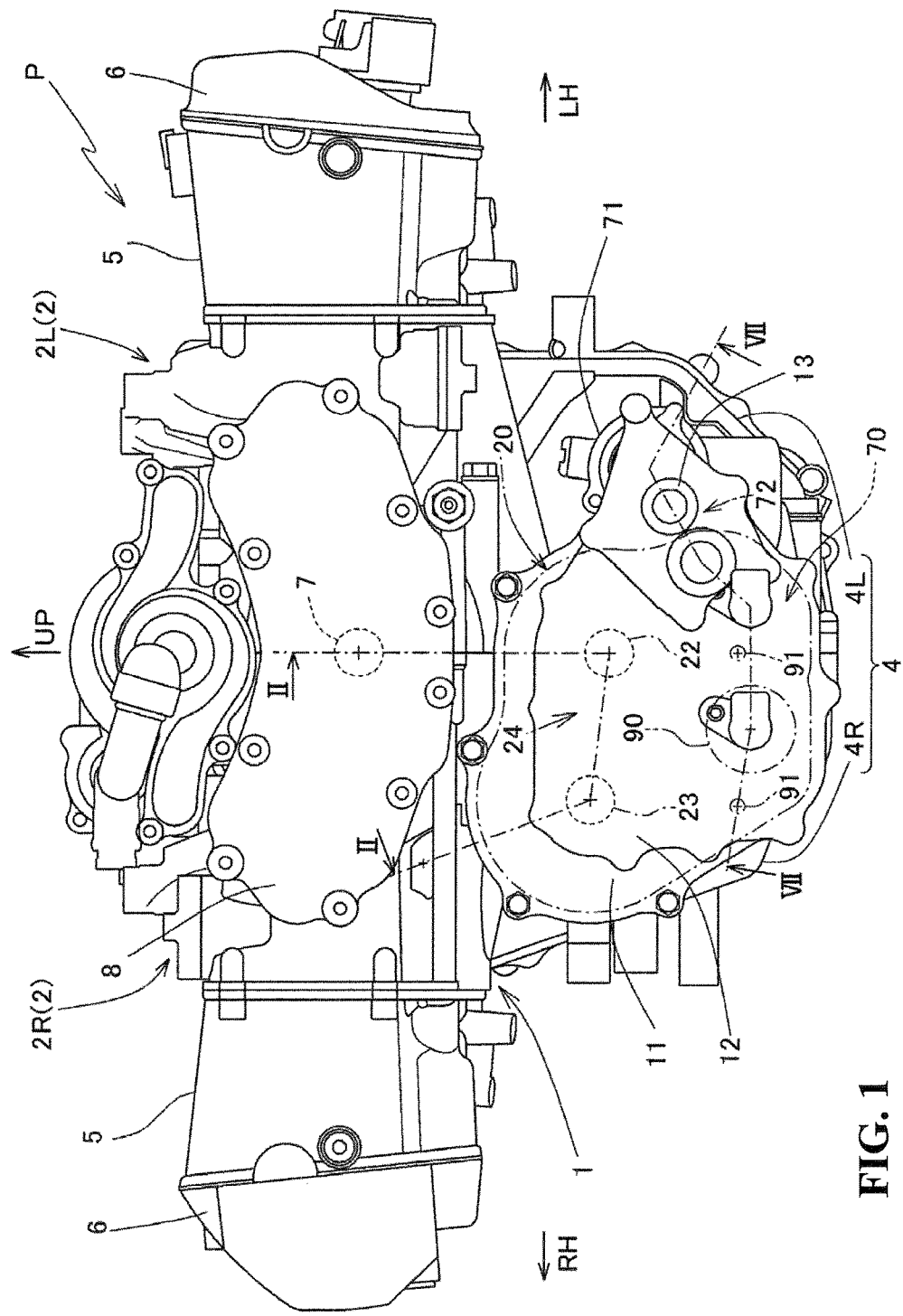
FIG. 1 is a front view of a partly-omitted power unit used for one embodiment of the present invention.

FIG. 1 is a front view of a partly-omitted power unit P in which a twin-clutch transmission 20 according to one embodiment of the present invention is used.

The power unit P is mounted on a motorcycle and includes a water-cooled four-stroke-cycle internal combustion engine 1 that includes horizontally-opposed six cylinders and is mounted in a so-called longitudinal manner in which a crankshaft 7 is along the front-rear direction of the vehicle. The twin-clutch transmission 20 is joined to the internal combustion engine 1 and carries out a gear shift to a predetermined shift stage regarding power of the internal combustion engine 1.

In the present specification, the front, rear, left, and right directions comply with a normal standard in which the straight advancement direction in the motorcycle is defined as the front direction.

As symbols of the front, rear, left, right, upward, and downward directions in the drawings, FR, RR, LH, RH, UP, and DW are given.

As shown in FIG. 1, the internal combustion engine 1 includes the following components an engine block 2 composed of a left engine block half body 2L disposed on the left side in the state in which the motorcycle is oriented toward the front side of the traveling direction and a right engine block half body 2R disposed on the right side in the state in which the motorcycle is oriented toward the front side of the traveling direction; cylinder heads 5 each joined to the left and right ends of the left engine block half body 2L and the right engine block half body 2R and head covers 6 overlapped on the respective cylinder heads 5.

As shown in FIG. 1, a front cover 8 that covers the front surface of the upper part of the engine block 2, with the crankshaft 7 at the center, is attached to the front surface of the upper part of the engine block 2.

Furthermore, below the engine block 2, a transmission chamber 14 (shown by a one-dot chain line in FIG. 1) in which a gear change mechanism 21 of the twin-clutch transmission 20 to be described later is housed is defined by a left crankcase half body 4L and a right crankcase half body 4R.

As shown in FIG. 1, to the front surface of the lower part of a crankcase 4, a transmission holder 11 is attached to cover the front side of the transmission chamber 14. A gear shift drive system holder 12 for holding a gear shift drive mechanism 70 that operates the shift stage of the gear change mechanism 21 in the area from the center to the lower part of the transmission holder 11 is attached to the front surface of the transmission holder 11.

A reducer cover 13 is attached to the front surface of the left end part of the gear shift drive system holder 12, and a reduction gear mechanism 72 to be described later is disposed in a reducer chamber 15 surrounded by the gear shift drive system holder 12 and the reducer cover 13.

Furthermore, a shift motor 71 that is an actuator of a power source of the gear shift drive mechanism 70 is provided on the rear surface of the left end part of the gear shift drive system holder 12.

As shown in FIG. 1, on the rear surface of the transmission holder 11, a main shaft 22, a countershaft 23, a shift drum 90, shift fork shafts 91, and so forth of the gear change mechanism 21 are sub-assembled and are integrally configured as a cassette unit.

The main shaft 22, the countershaft 23, the shift drum 90, and the shift fork shafts 91 inserted in the transmission chamber 14 are disposed to be oriented along the front-rear direction so as to be in parallel to the crankshaft 7.

Furthermore, as shown in FIG. 1, the main shaft 22 is disposed below the crankshaft 7 and the countershaft 23 is disposed on the right side of the main shaft 22.

The shift drum 90 is disposed at the center of the lower part of the transmission chamber 14 with the two shift fork shafts 91 being disposed on the left and right sides of the shift drum 90 and below the main shaft 22 and the countershaft 23.

Figure 2:
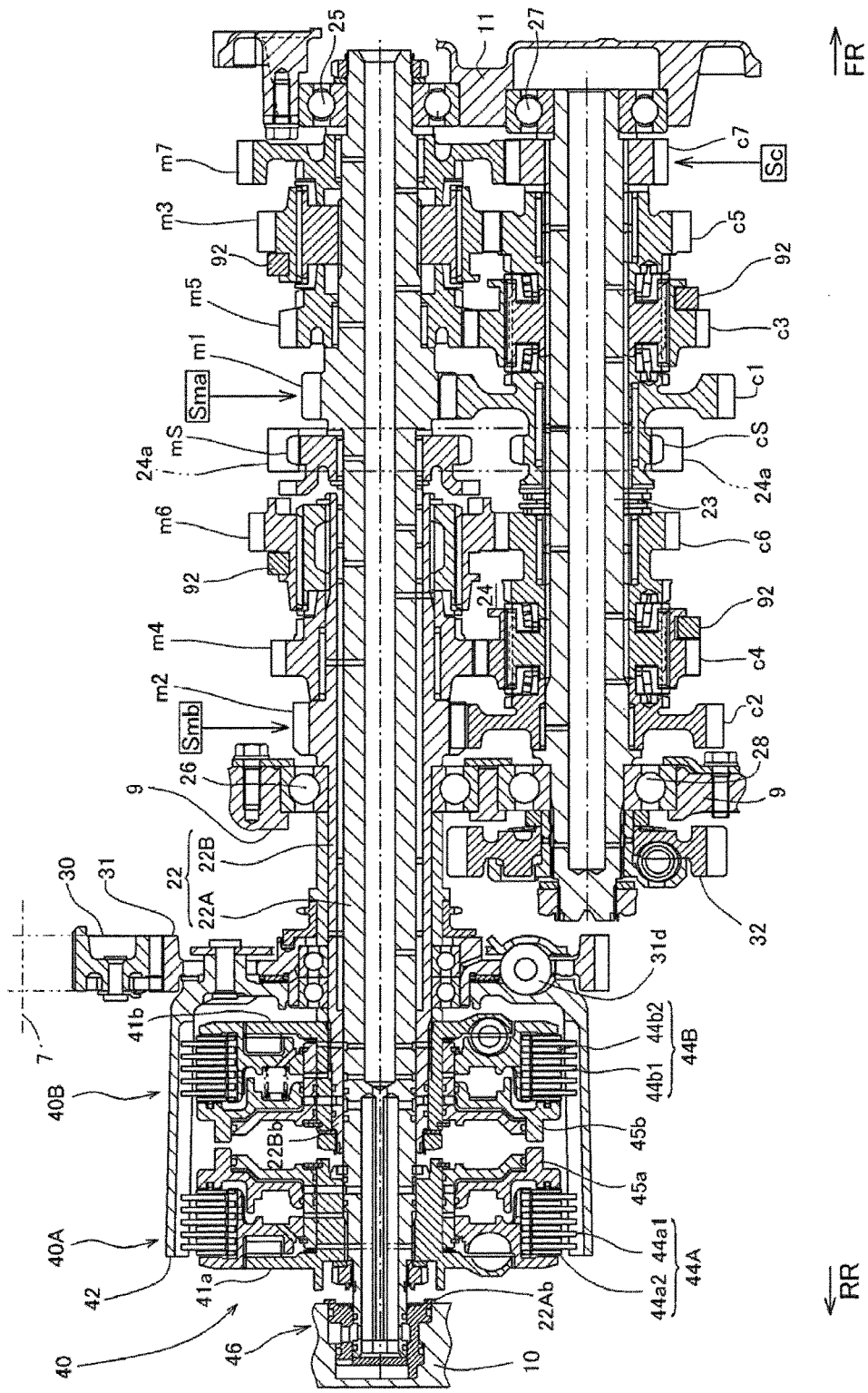
FIG. 2 is a sectional view of a gear change mechanism along line II-II in FIG. 1 as viewed in a direction of arrows II.

FIG. 2 is a sectional view of the gear change mechanism 21 along line II-II in FIG. 1 as viewed in a direction of arrows II.

As shown in FIG. 2, the gear change mechanism 21 composed of the main shaft 22, the countershaft 23, and a transmission gear group is provided with a twin clutch 40.

The main shaft 22 oriented along the front-rear direction in the gear change mechanism 21 is composed of a long odd-stage main shaft 22A that pivotally supports drive transmission gears m1, m3, m5, and m7 of odd stages and a short even-stage main shaft 22B that is fitted to the outside of the odd-stage main shaft 22A relatively rotatably with the intermediary of a needle bearing (not shown) and pivotally supports drive transmission gears m2, m4, and m6 of even stages.

In the odd-stage main shaft 22A, the front end is supported by the transmission holder 11 with the intermediary of a ball bearing 25 and the rear end is rotatably supported by a clutch cover 10.

The intermediate part of the even-stage main shaft 22B is supported by a rear cover 9 with the intermediary of a ball bearing 26.

Meanwhile, in the countershaft 23 disposed on the right side of the main shaft 22 in parallel, the front end is supported by the transmission holder 11 with the intermediary of a ball bearing 27 and the rear part penetrates the rear cover 9 and is supported by the rear cover 9 with the intermediary of a ball bearing 28.

A secondary drive gear 32 is splined to the rear end part of the countershaft 23 penetrating the rear cover 9.

Between the ball bearing 25 at the front end and the ball bearing 26 at the center, which support the main shaft 22, the drive transmission gears m, m3, m5, and m7 of odd stages are provided at the front part of the odd-stage main shaft 22A exposed on the front side relative to the even-stage main shaft 22B and the drive transmission gears m2, m4, and m6 of even stages are provided at the front part of the even-stage main shaft 22B.

Meanwhile, on the countershaft 23, corresponding to the above-described drive transmission gears m1 to m7, driven transmission gears c1 to c7 that constantly mesh with the drive transmission gears m1 to m7, respectively, are provided.

Furthermore, on the odd-stage main shaft 22A and the countershaft 23, sprockets mS and cS for reverse are provided at positions opposed to each other. A chain 24a is stretched around the sprockets mS and cS for reverse.

The gear change mechanism 21 is configured by these drive transmission gears m1 to m7, driven transmission gears c1 to c7, and sprockets mS and cS for reverse.

The third drive transmission gear m3 and the sixth drive transmission gear m6 are shifter gears that can slide on the main shaft 22 in the axial direction and are selectively joined to the adjacent drive transmission gear m4, mS, or m7 or the sprocket mS for reverse with the intermediary of synchromesh S.

Furthermore, the fourth driven transmission gear c4 and the third driven transmission gear c3 are shifter gears that can slide on the countershaft 23 in the axial direction and are selectively joined to the adjacent driven transmission gear c1, c2, c5, or c6 with the intermediary of the synchromesh S.

A fork engagement groove 52b is made in each of the above-described shifter gears and the movement of the shifter gear in the axial direction is enabled by a shift fork 92 that engages with this fork engagement groove 52b.

As shown in FIG. 2, the twin clutch 40 is provided at the rear part of the main shaft 22 disposed to protrude rearwardly from the rear cover 9.

The twin clutch 40 is formed as a so-called twin-clutch system having an odd-stage hydraulic clutch 40A joined to the odd-stage main shaft 22A, an even-stage hydraulic clutch 40B joined to the even-stage main shaft 22B, and a clutch outer 42.

An odd-stage clutch inner 41a of the odd-stage hydraulic clutch 40A is splined, with limitation of movement in the axial direction, to the vicinity of a rear end part 22Ab of the odd-stage main shaft 22A disposed to protrude rearwardly from a rear end part 22Bb of the even-stage main shaft 22B.

An even-stage clutch inner 41b of the even-stage hydraulic clutch 40B is splined to the vicinity of the rear end part 22Bb of the even-stage main shaft 22B with limitation of movement in the axial direction.

The clutch outer 42 is supported, with the intermediary of a damping member 31d, by a primary driven gear 31 rotatably supported by the even-stage main shaft 22B between the even-stage hydraulic clutch 40B and the rear cover 9.

The primary driven gear 31 meshes with a primary drive gear 30 fitted to the crankshaft 7 and a rotational driving force supplied from the crankshaft 7 is subjected to reduction at a predetermined reduction ratio and is transmitted to the twin clutch 40.

Between the clutch outer 42 and the odd-stage clutch inner 41a, an odd-stage friction plate group 44A in which drive friction plates 44a1 that rotate tocome intoher with the clutch outer 42 and driven friction plates 44a2 that rotate tocome intoher with the odd-stage clutch inner 41a are alternately arranged is provided so that a pressure can be applied thereto by an odd-stage pressurizing plate 45a.

Furthermore, between the clutch outer 42 and the even-stage clutch inner 41b, an even-stage friction plate group 44B in which drive friction plates 44b1 that rotate tocome intoher with the clutch outer 42 and driven friction plates 44b2 that rotate tocome intoher with the even-stage clutch inner 41b are alternately arranged is provided so that a pressure can be applied thereto by an even-stage pressurizing plate 45b.

A hydraulic circuit 46 that can selectively drive the odd-stage pressurizing plate 45a and the even-stage pressurizing plate 45b is provided on the odd-stage main shaft 22A and the clutch cover 10.

A hydraulic pressure is selectively supplied to the odd-stage hydraulic clutch 40A and the even-stage hydraulic clutch 40B by the hydraulic circuit 46. When one of the clutches is connected, connection of the other is released.

When the odd-stage hydraulic clutch 40A is connected by the hydraulic circuit 46, the rotation of the clutch outer 42 of the twin clutch 40 to which the rotation of the crankshaft 7 is transmitted via the meshing between the primary drive gear 30 and the primary driven gear 31 is transmitted to the odd-stage main shaft 22A to rotate the odd-stage main shaft 22A. When the even-stage hydraulic clutch 40B is connected, the rotation of the clutch outer 42 is transmitted to the even-stage main shaft 22B to rotate the even-stage main shaft 22B.

Power transmitted from the crankshaft 7 to the odd-stage main shaft 22A or the even-stage main shaft 22B via the twin clutch 40 is transmitted to the countershaft 23 at a shift stage selectively established by the gear change mechanism 21.

In this gear change mechanism 21, between each shifter gear and the transmission gear joined to the shifter gear, the synchromesh S that establishes a respective one of the shift stages with synchronization is provided.

The synchromesh S set between the second driven transmission gear c2 that establishes the second stage among the respective shift stages and the fourth driven transmission gear c4 as the shifter gear will be described on the basis of FIGS. 3 and 4.

The other synchromesh also has the same mechanism.

Figure 3:
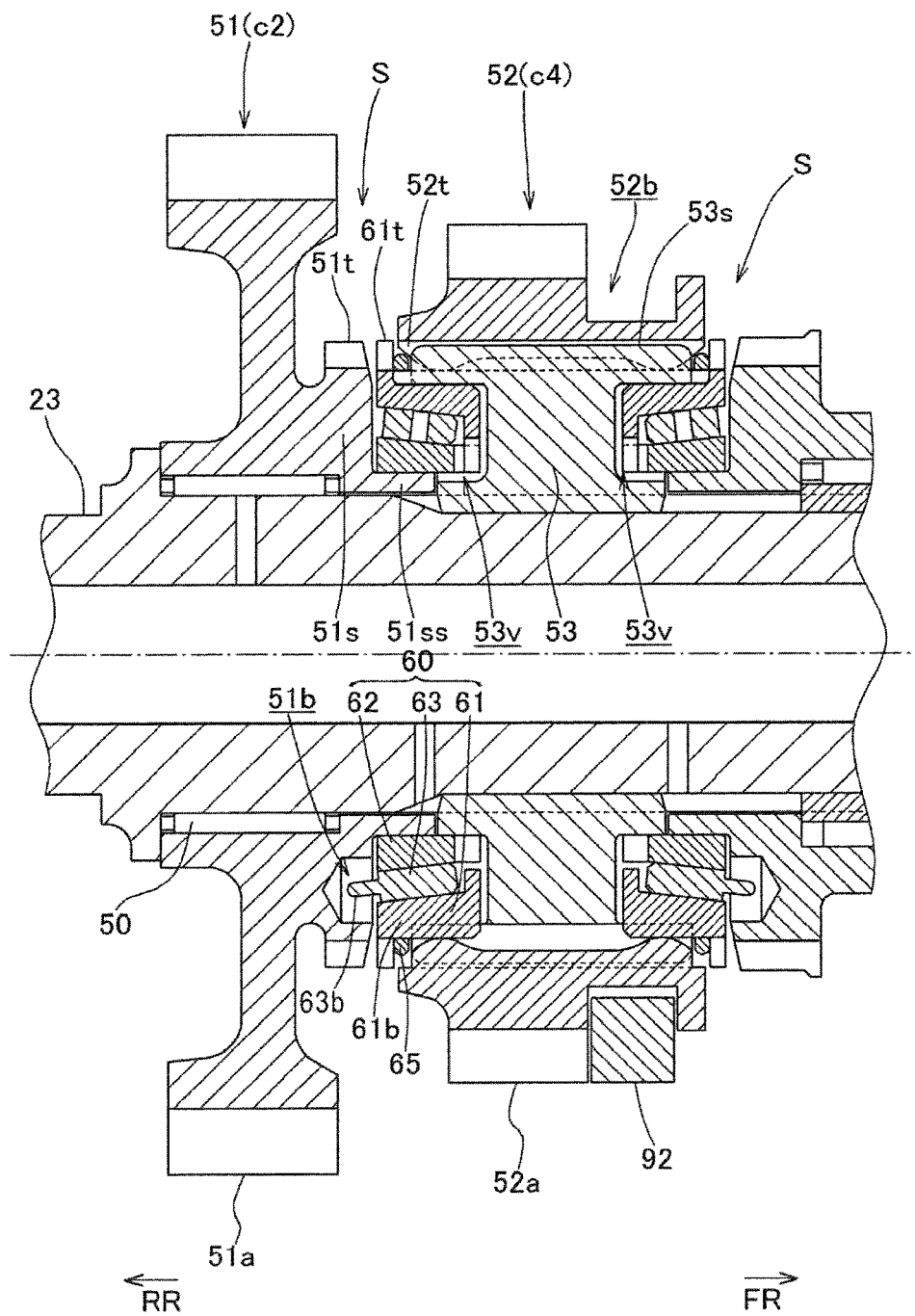
FIG. 3 is a sectional view made by partly enlarging FIG. 2.

FIG. 3 is a sectional view made by enlarging part of the sectional view of the gear change mechanism in FIG. 2. FIG. 4 collectively shows a sectional view made by further enlarging the major part in FIG. 3 and a partial sectional view obtained by cutting the major part in the circumferential direction and expanding the cut plane.

As shown in FIG. 3, a transmission gear 51 typified by the second driven transmission gear c2 is pivotally supported rotatably by the rotating shaft (countershaft) 23 with the intermediary of a needle bearing 50.

The transmission gear 51 has transmission gear teeth 51a (second driven transmission gear teeth) at the outer circumference. In addition, gear dog teeth 51t are formed at the outer circumference of a cylindrical part 51s protruding with a reduced diameter toward the fourth driven transmission gear c4.

Furthermore, a protruding cylindrical part 51ss obtained by further protrusion of the inner circumferential part of the cylindrical part 51s having the gear dog teeth 51 at the outer circumference is formed.

On the other hand, the fourth driven transmission gear c4 as the shifter gear is equivalent to a synchronizer sleeve 52. The synchronizer sleeve 52 is splined to the outer circumferential surface of a hub 53 splined to the countershaft 23 in such a manner so as to be restricted from moving in the axial direction, and is fitted to the outside of the hub 53 slidably in the axial direction.

Sleeve teeth 52t formed on the inner circumferential surface of the synchronizer sleeve 52 are fitted to spline teeth 53s formed on the outer circumferential surface of the hub 53.

In the outer circumferential surface of the hub 53, on which the large number of spline teeth 53s are formed, at three places located at intervals of 120 degrees in the circumferential direction, the spline teeth 53s are not formed and cut grooves 53b are formed instead.

Both ends of each of the sleeve teeth 52t arranged on the inner circumferential surface of the synchronizer sleeve 52 in an annular manner are tapered.

The synchronizer sleeve 52 has shifter gear teeth 52a (fourth driven transmission gear teeth) at the outer circumference and the fork engagement groove 52b with which a shift fork is engaged is formed.

In the hub 53, which supports the synchronizer sleeve 52, ring-shaped recesses 53v are formed on both front and rear sides between the base part fitted to the countershaft 23 and the outer circumferential part at which the spline teeth 53s are formed.

The protruding cylindrical part 51ss of the transmission gear 51 abuts against the base part of the hub 53 and the end surface of the cylindrical part 51s having the gear dog teeth 51t of the transmission gear 51 at the outer circumference is opposed to the opening of the ring-shaped recess 53v of the hub 53.

A blocking ring 60 is set in a ring-shaped space formed by the opposing of the end surface of the cylindrical part 5 is to this opening of the ring-shaped recess 53v of the hub 53.

The blocking ring 60 is composed of an outer ring 61 and an inner ring 62, each have a circular ring shape and being coaxially disposed outside and inside to be overlapped with each other. A tapered cone 63 is set between the outer ring 61 and the inner ring 62.

The outer circumferential surface and the inner circumferential surface of the tapered cone 63 are both formed as a tapered surface and are in surface contact with the inner circumferential tapered surface of the outer ring 61 and the outer circumferential tapered surface of the inner ring 62, respectively, relatively rotatably.

The outer ring 61 is equivalent to a synchronizer ring and with a plurality of ring teeth 61t each having a dog tooth shape being formed in the circumferential direction on the outer circumferential surface of the outer ring 61.

Moreover, on the outer circumferential surface of the outer ring 61, projections 61b are formed at intervals of 120 degrees in the circumferential direction. The three projections 61b engage with the respective three cut grooves 53b of the hub 53.

Figure 4:
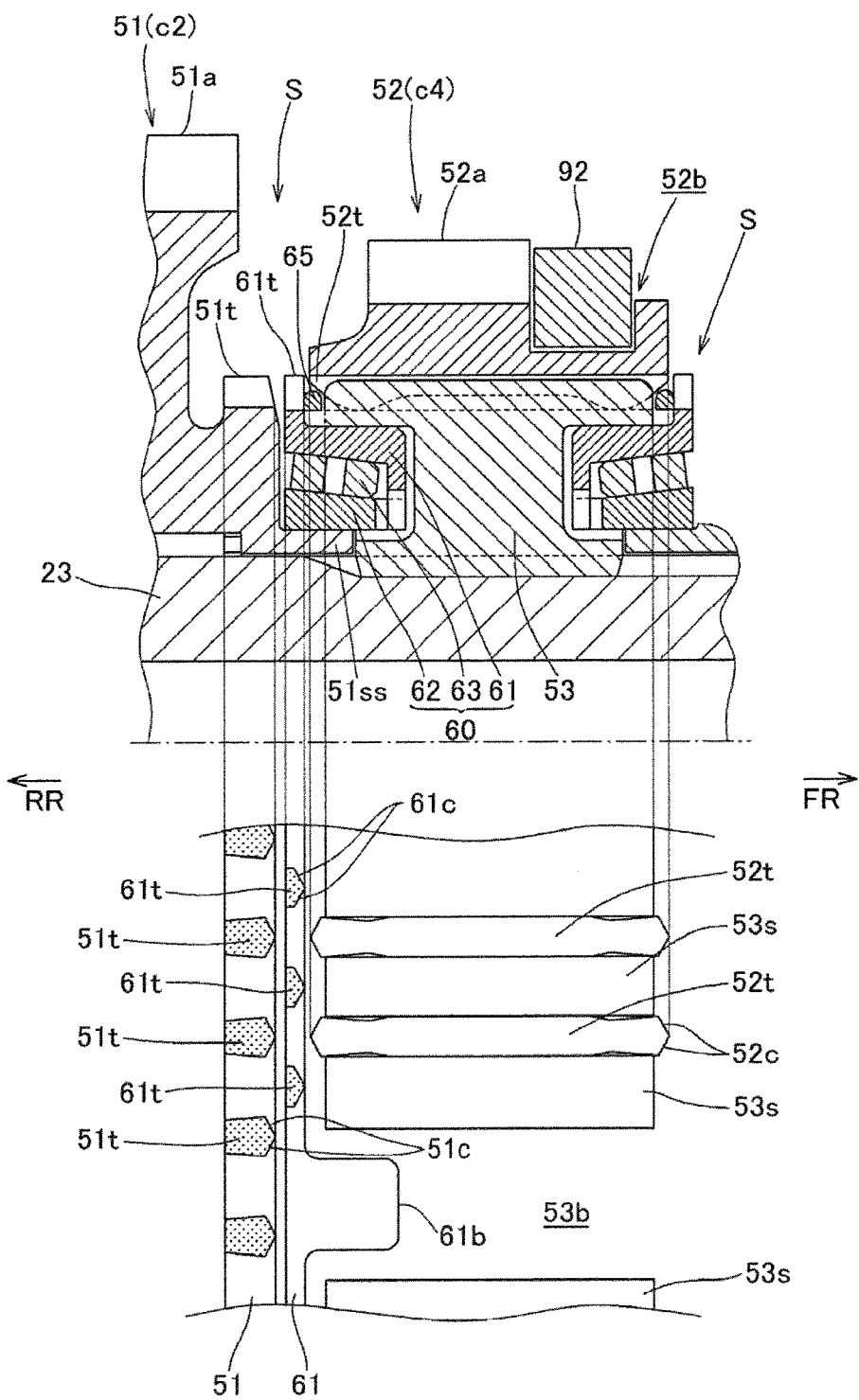
FIG. 4 is an explanatory diagram collectively showing an enlarged sectional view of the major part in FIG. 2 and a partial sectional view obtained by cutting the major part in the circumferential direction and expanding the cut plane.

The circumferential width of the projection 61b of the outer ring 61 is smaller than the circumferential width of the cut groove 53b of the hub 53 and the rotation of the outer ring 61 relative to the hub 53 is restricted in a predetermined rotation range (see FIG. 4).

A synchronizer spring 65 is disposed between the outer ring 61 and the spline teeth 53s of the hub 53 and is supported by the projections 61b of the outer ring 61 from the inside (see FIG. 3).

Referring to FIG. 3, a projection 63b protruding toward the transmission gear 51 (rearwardly) is formed at the rear end part of the tapered cone 63. The projection 63b is fitted to a recess 51b formed in the cylindrical part 51s having the gear dog teeth 51t of the transmission gear 51 at the outer circumference and the tapered cone 63 rotates integrally with the transmission gear 51.

As shown in FIG. 4, the sleeve teeth 52t of the synchronizer sleeve 52, the ring teeth 61t of the outer ring 61, and the gear dog teeth 51t of the transmission gear 51 exist on the same radius from the central axis of the rotating shaft (countershaft) 23, and are arranged in order of the sleeve teeth 52t, the ring teeth 61t, and the gear dog teeth 51t in the front-rear direction. The synchronizer spring 65 is located between the sleeve teeth 52t and the ring teeth 61t.

Both the front and rear ends of the sleeve teeth 52t are each formed to be tapered by a pair of inclined chamfer surfaces 52c, and the pair of chamfer surfaces 52c intersect at an obtuse angle.

In each ring tooth 61t, the end part on the side of the sleeve teeth 52t is formed to be tapered by similar chamfer surfaces 61c.

Similarly, also in each gear dog tooth 51t, the end part on the side of the sleeve teeth 52t is formed to be tapered by similar chamfer surfaces 51c.

The synchromesh S is formed in the above-described manner.

The synchronization operation of the synchromesh S will be described on the basis of FIGS. 4 to 6.

The state shown in FIG. 4 is a neutral state before the start of gear shift. In this state, the synchronizer sleeve 52 exists at a neutral position and the sleeve teeth 52t are not in contact with the synchronizer springs 65 on the front and rear sides.

The outer ring 61 and the inner ring 62 rotate integrally with the hub 53, whereas the tapered cone 63 rotates integrally with the transmission gear 51. However, the tapered cone 63 is in the state of being rotatable relative to the outer ring 61 and the inner ring 62 and thus the synchronization operation is not caused.

Figure 5:
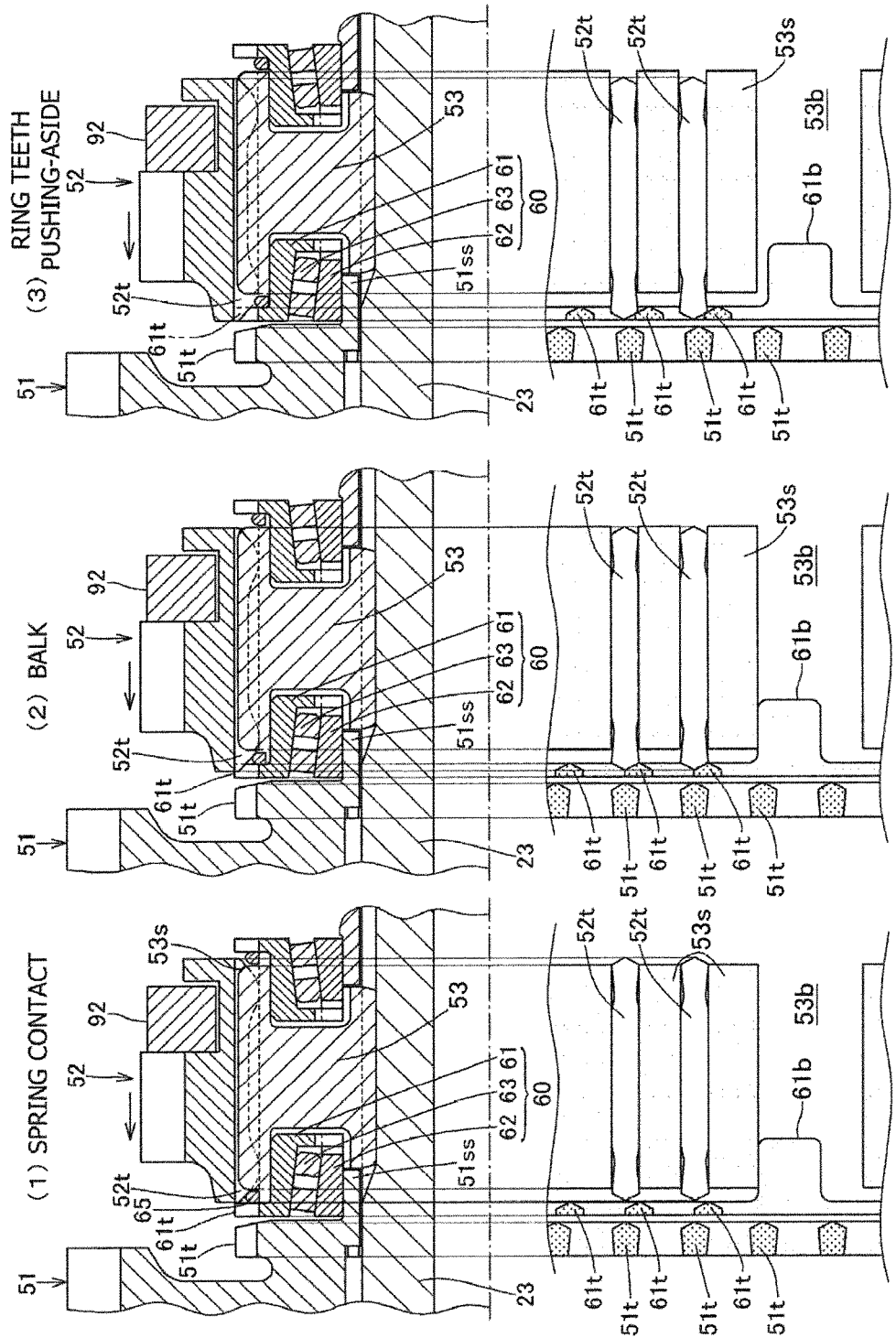
FIG. 5 are explanatory diagrams sequentially showing the former-half synchronization operation of synchromesh at the time of gear shift.

When gear shift is started and the synchronizer sleeve 52 moves rearwardly, as shown in FIG. 5(1), the sleeve teeth 52t of the synchronizer sleeve 52 come into contact with the synchronizer spring 65 and it becomes possible to press the blocking ring 60 toward the transmission gear 51 through the synchronizer spring 65.

When the synchronizer sleeve 52 further moves rearwardly, as shown in FIG. 5(2), the blocking ring 60 is pressed toward the transmission gear 51 and a friction force is generated between the tapered surfaces of the outer ring 61 and the tapered cone 63 and between the tapered surfaces of the tapered cone 63 and the inner ring 62, which rotates the outer ring 61. In addition, a friction force between the inner ring 62 and the protruding cylindrical part 51ss of the transmission gear 51 is also generated. Meanwhile, the apexes of the sleeve teeth 52t come into contact with the apexes of the ring teeth 61t and furthermore the chamfer surfaces 52c and 61c abut against each other, so that synchronization is started (balk stage).

When the synchronizer sleeve 52 further moves rearwardly, as shown in FIG. 5(3), the sleeve teeth 52t mesh with the ring teeth 61t in such a manner as to push aside the ring teeth 61t and the synchronizer sleeve 52 and the outer ring 61 integrally rotate (ring teeth pushing-aside stage).

Figure 6:
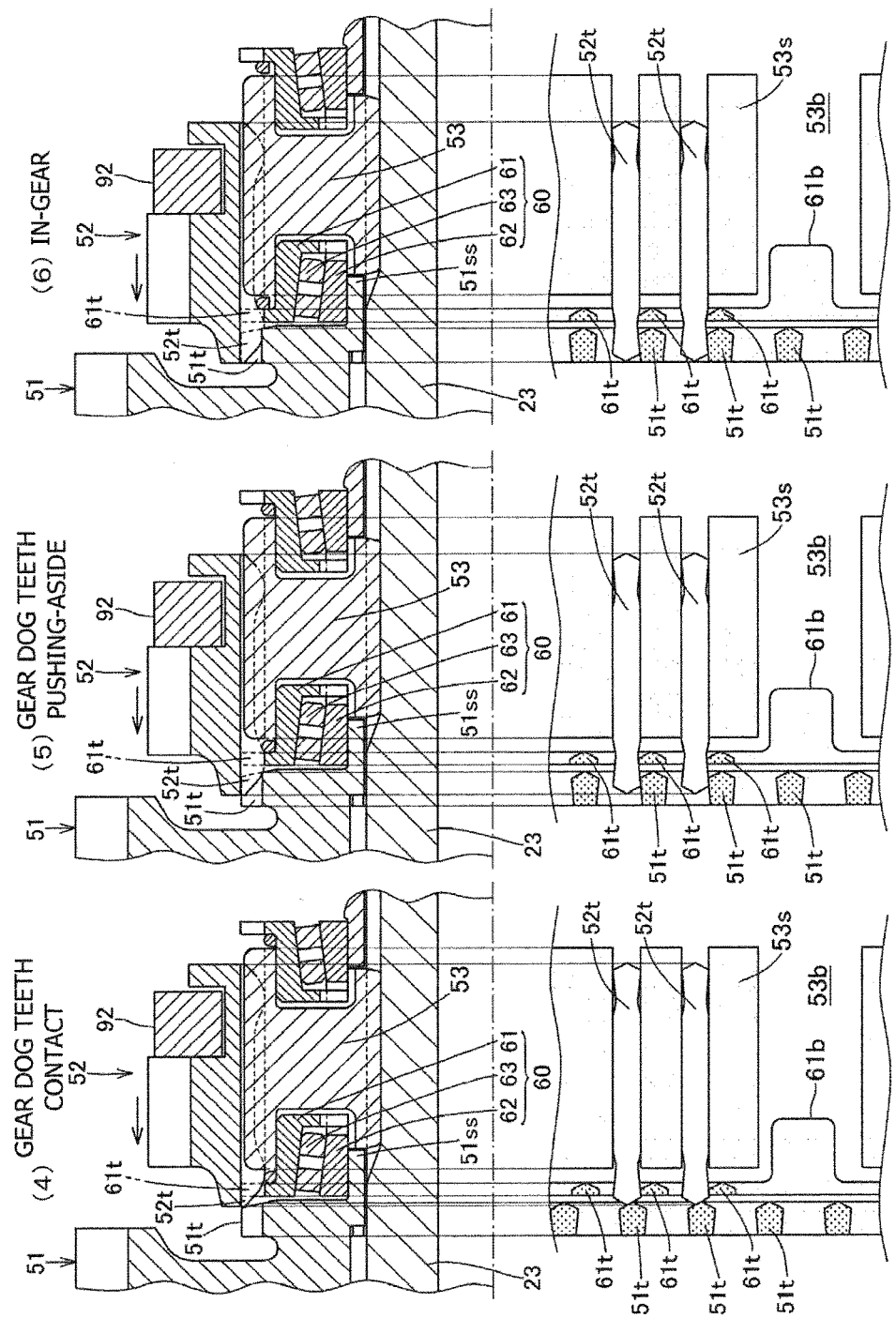
FIG. 6 are explanatory diagrams sequentially showing the latter-half synchronization operation of the synchromesh at the time of the gear shift.

When the synchronizer sleeve 52 further moves rearwardly, as shown in FIG. 6(4), the apexes of the sleeve teeth 52t come into contact with the apexes of the gear dog teeth 51t of the transmission gear 51 and furthermore the chamfer surfaces 52c and 51c abut against each other (gear dog teeth contact stage).

When the synchronizer sleeve 52 further moves rearwardly, as shown in FIG. 6(5), the sleeve teeth 52t mesh with the gear dog teeth 51t in such a manner as to push aside the gear dog teeth 51t, and the synchronization ends (gear dog teeth pushing-aside stage).

Due to the further rearward movement of the synchronizer sleeve 52, as shown in FIG. 6(6), the sleeve teeth 52t completely mesh with the gear dog teeth 51t and the synchronizer sleeve 52 (and the rotating shaft 23) and the transmission gear 51 integrally rotate (in-gear stage).

The synchromesh S operates in the above-described manner to join the synchronizer sleeve 52 and the transmission gear while synchronizing them.

Next, the gear shift drive mechanism 70 that moves the synchronizer sleeve 52 will be described on the basis of FIGS. 7 and 8.

Figure 7:
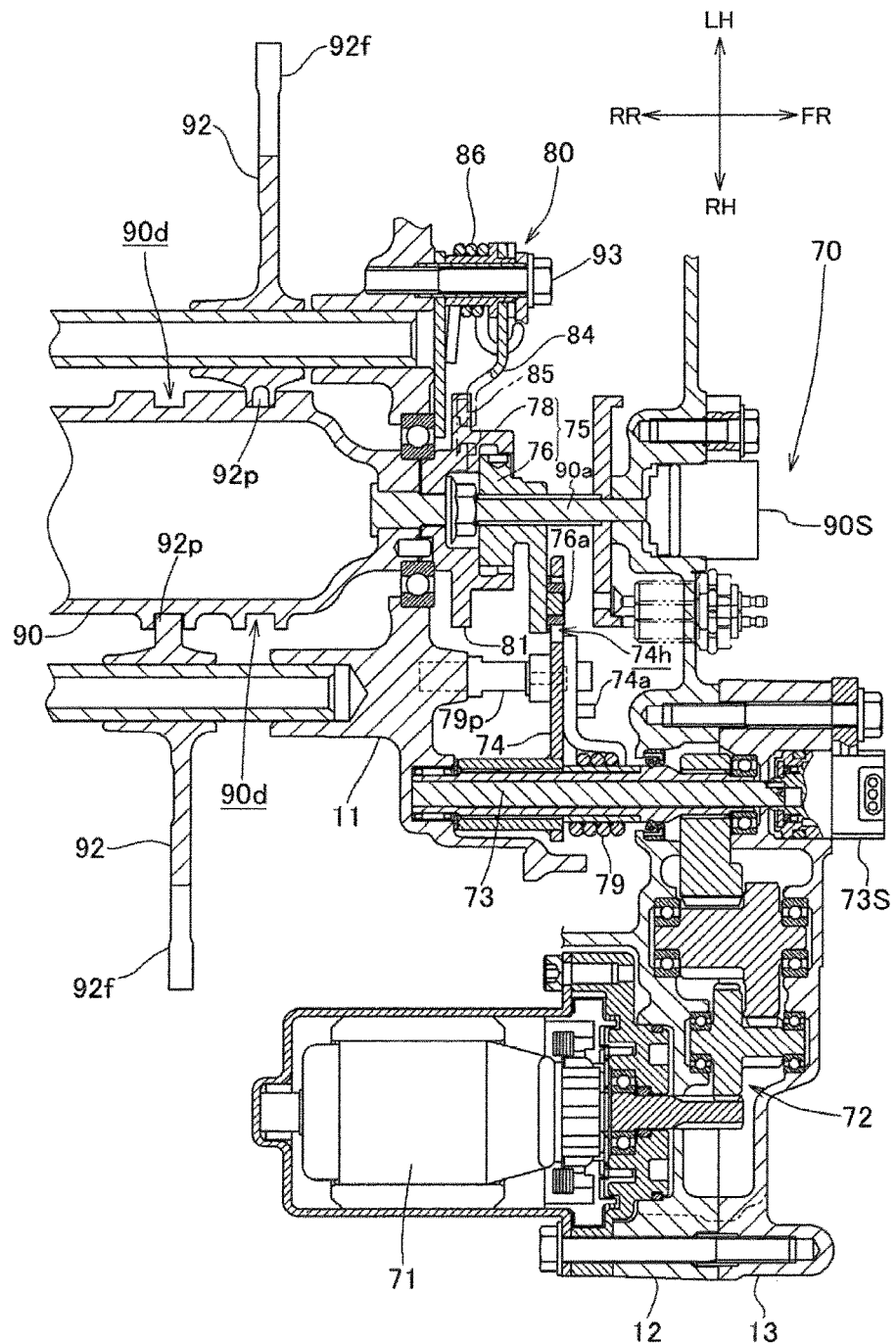
FIG. 7 is a sectional view of a gear shift drive mechanism along line VII-VII in FIG. 1 as viewed in a direction of arrows VII.

FIG. 7 is a sectional view of the gear shift drive mechanism 70 along line VII-VII in FIG. 1 as viewed in a direction of arrows VII.

As shown in FIG. 7, rotational power of the shift motor 71 of the gear shift drive mechanism 70 is subjected to reduction via the reduction gear mechanism 72 and is transmitted for the rotation of a shift spindle 73.

The base end part of a master arm 74 is fitted to the shift spindle 73 and the master arm 74 swings by the rotation of the shift spindle 73.

A pin 79p penetrating through a restriction hole 74b formed in the master arm 74 is provided to protrude on the transmission holder 11. A torsion coil spring 79 supported by the shift spindle 73 through winding of its coil part around the shift spindle 73 is so attached that both end parts thereof extending in the same direction sandwich a locking piece 74a formed on the master arm 74 and the pin 79p from both outsides.

Therefore, when the master arm 74 swings, a biasing force that attempts to return the master arm 74 to the neutral position acts due to a torsion spring force of the torsion coil spring 79.

The swing of the master arm 74 rotates the shift drum 90 through a pole ratchet mechanism 75.

Figure 8:
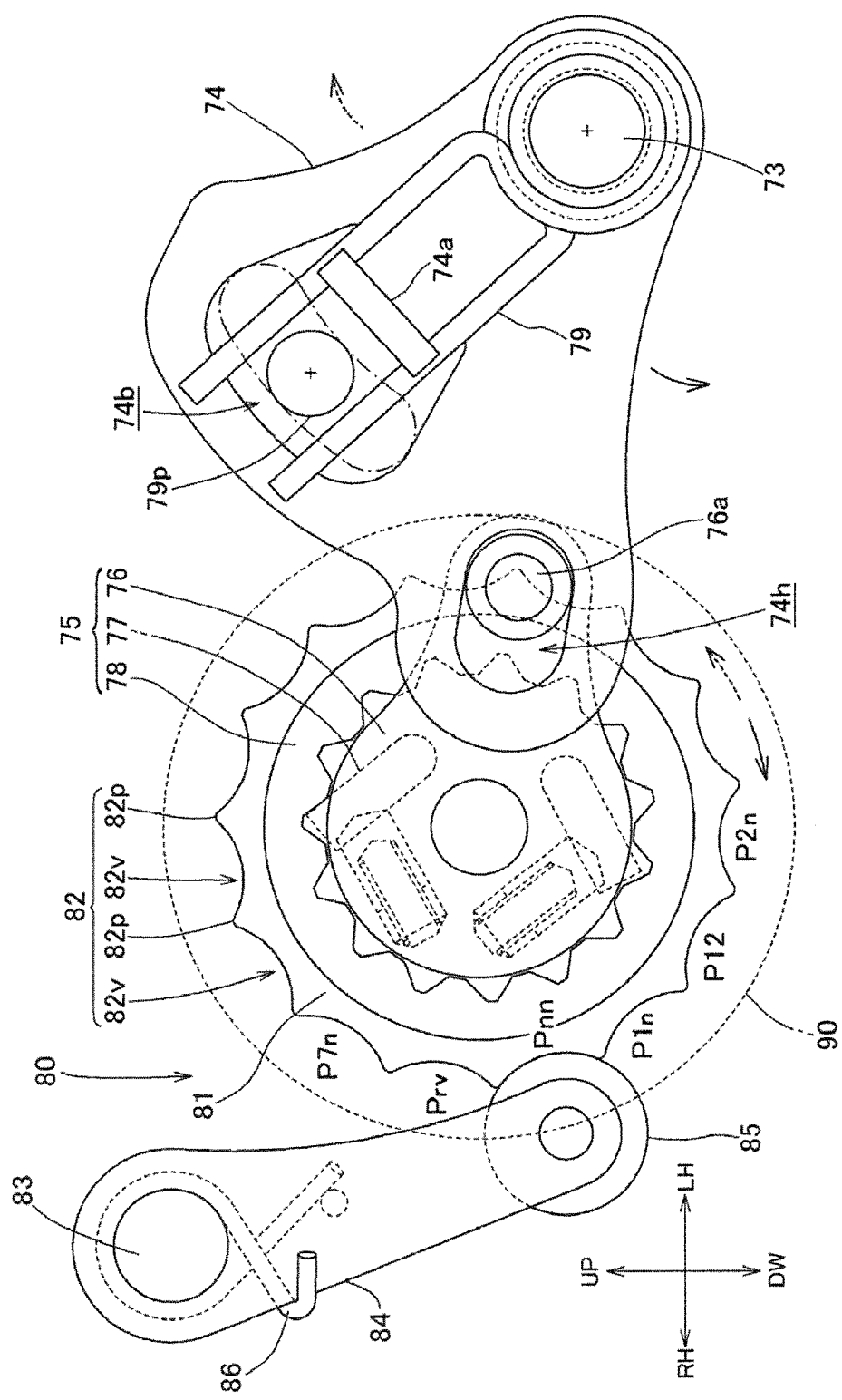
FIG. 8 is an enlarged view of a major part showing the gear shift drive mechanism with partial simplification.

As shown in FIG. 8, the pole ratchet mechanism 75 includes the following components a ratchet input member 76 on which a protrusion 76a slidably fitted into an elongated hole 74h formed at the swing tip part of the master arm 74 is formed; a ratchet output member 78 that rotates integrally with the shift drum 90 and a pair of poles 77 incorporated between the outer circumference of the ratchet input member 76 and the inner circumference of the ratchet output member 78.

When the ratchet input member 76 is rotated in one direction by being guided by the protrusion 76a that slides in the elongated hole 74h due to the swing of the master arm 74, the tip of one pole 77 stands up and is locked to a locking protrusion on the inner circumference of the ratchet output member 78, and the ratchet output member 78 is intermittently rotated in association with the rotation of the ratchet input member 76. Thus, the shift drum 90 is intermittently rotated to carry out gear shift.

For the intermittent rotation of the shift drum 90, a detent mechanism 80 that leads the shift drum 90 to a predetermined rotational position and positions the shift drum 90 is provided.

A star-shaped cam 81 is formed at the outer circumferential part of the ratchet output member 78, which rotates integrally with the shift drum 90.

As shown in FIG. 8, as the outer circumferential end surface of the star-shaped cam 81, a recess-projection cam surface 82 is formed in which curved detent recess parts 82v corresponding to shift stages and projection parts 82p protruding into a tapered shape are alternately arranged continuously in the circumferential direction sequentially.

Referring to FIG. 8, a roller 85 is pivotally supported rotatably at the tip of a detent arm 84 pivotally supported swingably by a support shaft 83.

The detent arm 84 is biased to swing by a torsion coil spring 86 and presses the roller 85 against the recess-projection cam surface 82 of the star-shaped cam 81.

The detent mechanism 80 is formed in the above-described manner. The roller 85 pressed against the recess-projection cam surface 82 of the star-shaped cam 81 is settled in the requisite detent recess part 82v, which allows positioning of the star-shaped cam 81 and the shift drum 90 at the requisite rotational position.

The shift drum 90 has preliminary rotational positions between the respective shift stages in addition to the rotational positions of the respective shift stages of seven speeds and the rotational position of reverse. More specifically, the shift drum 90 has fifteen rotational positions in order of reverse rotational position Pry, neutral rotational position Pnn, first rotational position P1n, first-second preliminary rotational position P12, second rotational position P2n, . . . . Corresponding to this, fifteen detent recess parts 82v are formed in the recess-projection cam surface 82 of the star-shaped cam 81 (see FIG. 8).

In the outer circumferential surface of the shift drum 90, four lead grooves 90d, extending along the circumferential direction with offsets in the width direction, are formed to be arranged in the width direction.

As described above, the shift fork shafts 91 are disposed on the left and right sides of the shift drum 90 and two shift forks 92 are pivotally supported by each shift fork shaft 91 slidably in the axial direction. In each shift fork 92, a pin part 92p is slidably fitted into the lead groove 90d of the shift drum 90 and a bifurcated fork tip part 92f engages with the fork engagement groove 52b of the shifter gear of the gear change mechanism 21.

Therefore, when the shift drum 90 rotates due to driving by the shift motor 71 of the gear shift drive mechanism 70, each shift fork 92 moves in the axial direction by being guided by a corresponding one of the lead grooves 90d formed in the outer circumferential surface of the shift drum 90. Therefore, each shifter gear is moved in the axial direction and the shift stage is switched.

Referring to the sectional view of the gear shift drive mechanism 70 in FIG. 7, a shift spindle rotational position detecting sensor 73S that detects a rotational position (rotational angle) θ of the shift spindle 73 is provided at an end part of the shift spindle 73.

Furthermore, a shift drum rotational position detecting sensor 90S that detects the rotational position of the shift drum 90 is provided at an end part of an extension shaft 90a extending forward from the front end of the shift drum 90 on the rotation center axis.

Next, gear shift control to control driving of the shift motor 71 at the time of gear shift will be described on the basis of FIGS. 9 to 11.

Figure 9:
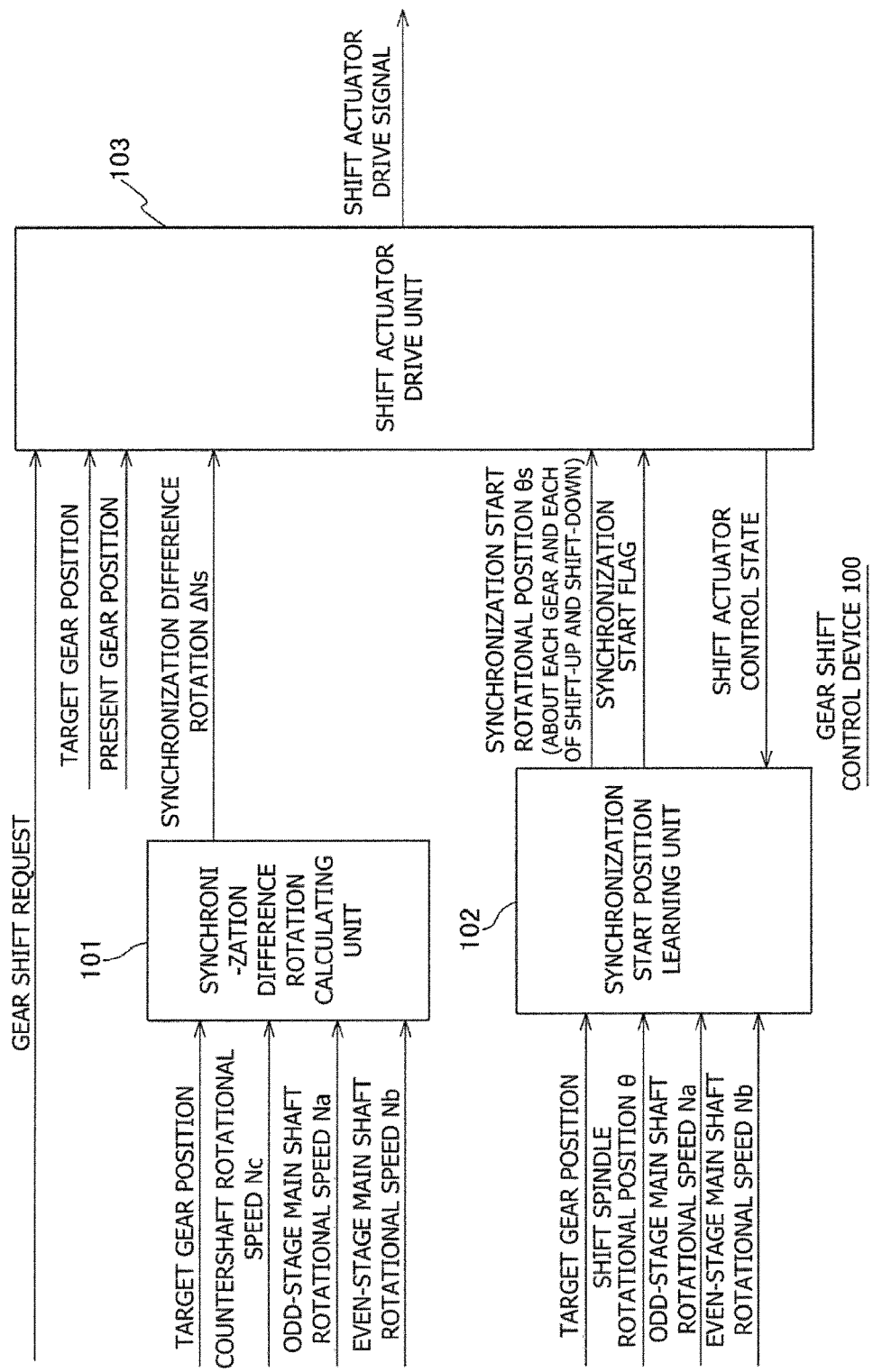
FIG. 9 is a block diagram of a gear shift control device.

FIG. 9 is a control block diagram of the gear shift control by a gear shift control device 100.

The gear shift control device 100 is composed of a synchronization difference rotation calculating unit 101, a synchronization start position learning unit 102, and a shift actuator drive unit 103.

Calculation by the synchronization difference rotation calculating unit 101 and learning by the synchronization start position learning unit 102 are processed on the basis of the respective rotational speeds (the numbers of rotations per unit time) of the odd-stage main shaft 22A, the even-stage main shaft 22B, and the countershaft 23 in the gear change mechanism 21.

Referring to the sectional view of the gear change mechanism in FIG. 2, an odd-stage main shaft rotational speed detecting sensor Sma that detects the rotational speed of the odd-stage main shaft 22A detects the rotational speed of e.g. the first drive transmission gear m1, which rotates integrally with the odd-stage main shaft 22A. An even-stage main shaft rotational speed detecting sensor Smb that detects the rotational speed of the even-stage main shaft 22B detects the rotational speed of e.g. the second drive transmission gear m2, which rotates integrally with the even-stage main shaft 22B.

Furthermore, a countershaft rotational speed detecting sensor Sc that detects the rotational speed of the countershaft 23 detects the rotational speed of e.g. the seventh driven transmission gear c7, which rotates integrally with the countershaft 23.

The synchronization difference rotation calculating unit 101 detects the rotational speed difference (synchronization difference rotation) between the rotational speed of a tarcome into transmission gear and the rotational speed of the synchronizer sleeve that is to synchronize with and be joined to the tarcome into transmission gear through the synchromesh. A tarcome into gear position and a countershaft rotational speed Nc, an odd-stage main shaft rotational speed Na, and an even-stage main shaft rotational speed Nb detected by the countershaft rotational speed detecting sensor Sc, the odd-stage main shaft rotational speed detecting sensor Sma, and the even-stage main shaft rotational speed detecting sensor Smb, respectively, are input to the synchronization difference rotation calculating unit 101 and the synchronization difference rotation calculating unit 101 executes calculation processing.

More specifically, when the reduction ratio of the tarcome into gear position is defined as a, synchronization difference rotation $\Delta Ns$ is figured out by calculation of the following expressions.

When the synchromesh S of the tarcome into gear position exists on the countershaft 23, $$\Delta Ns = Na/\alpha - Nc \text{ or } \Delta Ns = Nb/\alpha - Nc.$$

When the synchromesh S of the tarcome into gear position exists on the main shaft 22, $$\Delta Ns = Na - Nc^*\alpha \text{ or } \Delta Ns = Nb - Nc^*\alpha.$$

To the synchronization start position learning unit 102, the tarcome into gear position, the odd-stage main shaft rotational speed Na, the even-stage main shaft rotational speed Nb, and the rotational position θ of the shift spindle 73 detected by the shift spindle rotational position detecting sensor 73S are input. The synchronization start position learning unit 102 learns a synchronization start rotational position θs. Details of the synchronization start position learning unit 102 will be described later.

To the shift actuator drive unit 103, the respective signals of a gear shift request, the tarcome into gear position, and the present gear position and other signals are input and the synchronization difference rotation ΔNs calculated by the synchronization difference rotation calculating unit 101 and the synchronization start rotational position θs learned by the synchronization start position learning unit 102 are input. The shift actuator drive unit 103 executes calculation processing and outputs a shift actuator drive signal to the shift motor 71 to control the shift motor 71.

For example, in shifting up the shift stage from first to second, the shift drum 90 is rotated from the first rotational position Pin to the first-second preliminary rotational position P12 in advance to move the fourth driven transmission gear c4 (synchronizer sleeve 52) as the shifter gear rearward through the shift fork 92 and join the fourth driven transmission gear c4 to the driven transmission gear c2.

At this time, the synchronizer sleeve 52 is joined to the driven transmission gear c2 while synchronizing with it by the synchromesh S. A timing chart in this process is shown in FIG. 10.

The example of the synchronization operation of the synchromesh S shown in FIGS. 4 to 6 shows the respective stages of operation in which the fourth driven transmission gear c4 (synchronizer sleeve 52) is moved to be joined to the driven transmission gear c2 (transmission gear 51) with synchronization, and is synchronization operation when the shift drum 90 is rotated from the first rotational position Pin to the first-second preliminary rotational position P12.

Before the gear shift, the shift drum 90 exists at the first rotational position Pin and the synchronizer sleeve 52 exists at the neutral position (see FIG. 4).

In this state, the odd-stage clutch hydraulic pressure is high and the odd-stage hydraulic clutch 40A is connected. Furthermore, the even-stage clutch hydraulic pressure is low and connection of the even-stage hydraulic clutch 40B is released. Thus, power is transmitted to the odd-stage main shaft 22A and the odd-stage main shaft 22A rotates, whereas the even-stage main shaft 22B is in the rotation-free state. However, a slight hydraulic pressure is applied to the even-stage hydraulic clutch 40B and the drag of the even-stage main shaft 22B in association with the rotation of the odd-stage main shaft 22A is caused, which provides a state in which no difference exists between the odd-stage main shaft rotational speed Na and the even-stage main shaft rotational speed Nb as shown in FIG. 10.

When the shift motor 71 is driven and the gear shift is started (timing t1 in FIG. 10), the shift spindle 73 and the shift drum 90 in the gear shift drive mechanism 70 rotate and the synchronizer sleeve 52 (fourth driven transmission gear c4) moves through the shift fork 92.

The synchronizer sleeve 52 moves and the sleeve teeth 52t of the synchronizer sleeve 52 come into contact with the synchronizer spring 65 (see FIG. 5(1)). When the synchronizer sleeve 52 further moves, a friction force is generated in the tapered cone 63 of the blocking ring 60 and the apexes of the sleeve teeth 52t come into contact with the apexes of the ring teeth 61t. Furthermore, the chamfer surfaces 52c and 61c abut against each other, so that synchronization is started (timing t2 in FIG. 10, see the balk stage of FIG. 5(2)).

Around the timing of the synchronization start, control is carried out to slow the rotation of the shift spindle 73 and lead it to an appropriate rotational position (see the shift spindle rotational position θ in FIG. 10), to suppress gear shift shock and a collision sound caused by the collision of the sleeve teeth 52t with the ring teeth 61t.

When the synchronization is started, the second driven transmission gear c2, with which the second drive transmission gear m2 monolithic with the even-stage main shaft 22B meshes, receives resistance via the synchromesh S. Thus, the even-stage main shaft 22B dragged by the rotation of the odd-stage main shaft 22A also receives resistance and the rotational speed of the even-stage main shaft 22B decreases.

Figure 10:
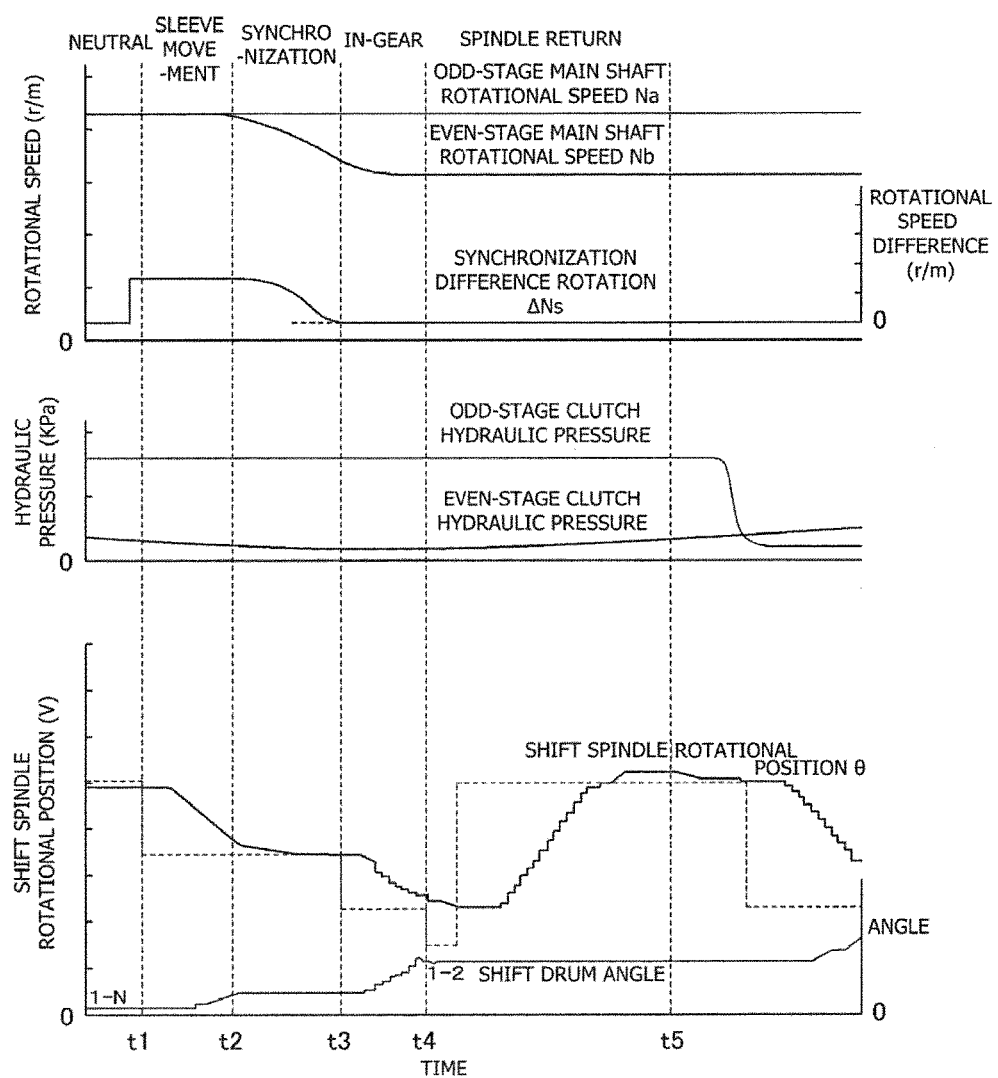
FIG. 10 is a timing chart of a gear shift process.
Figure 11:
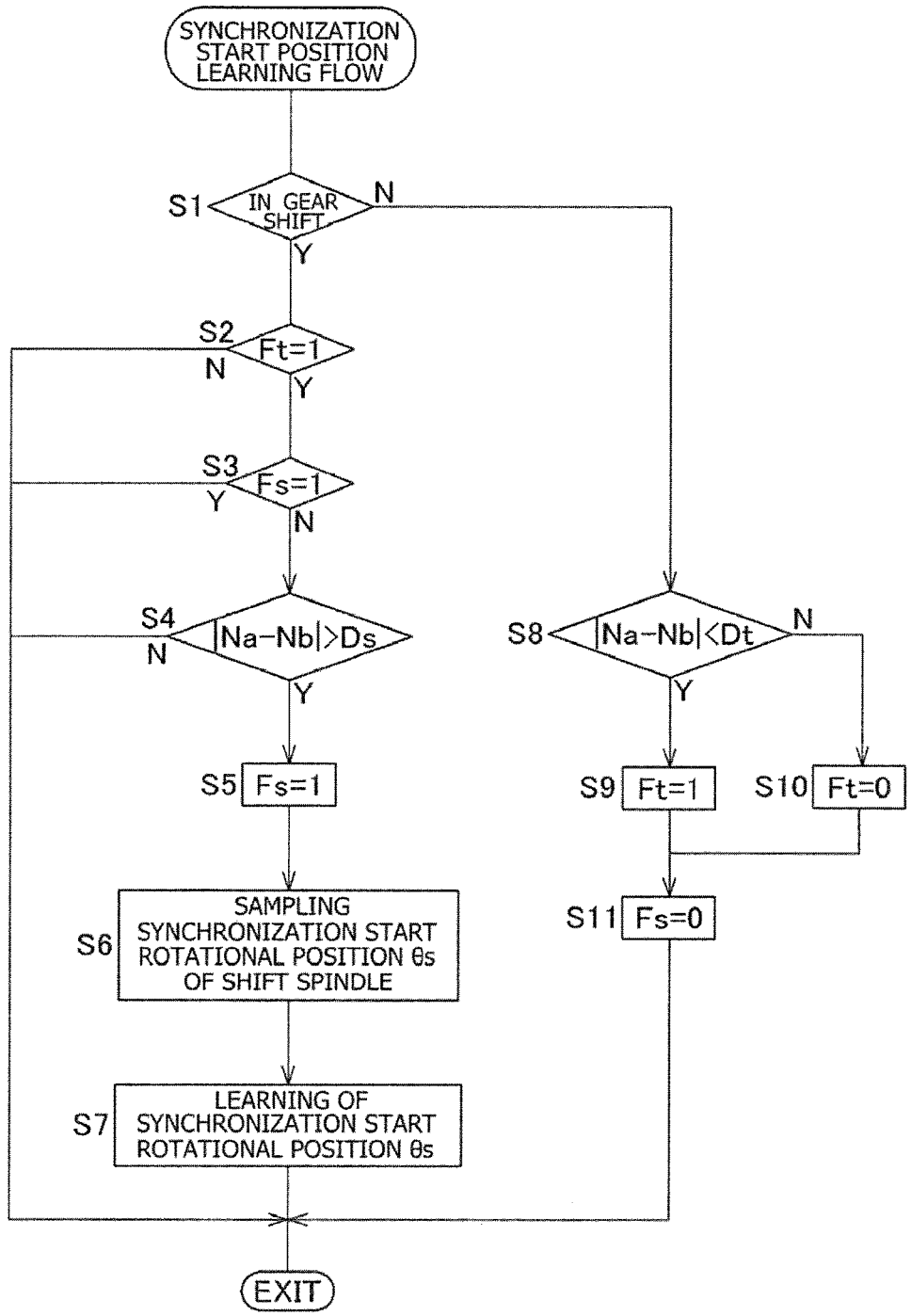
FIG. 11 is a flowchart showing the procedure of processing of detecting and learning gear shift drive displacement.

Therefore, as shown in FIG. 10, at the timing of the synchronization start, the even-stage main shaft rotational speed Nb decreases relative to the odd-stage main shaft rotational speed Na and a difference is caused in the rotational speed between both.

When the synchronizer sleeve 52 further moves and the synchronization progresses (see FIGS. 5(2) to 6(5)), the synchronization difference rotation ΔNs, which is the difference in the rotational speed between the second driven transmission gear c2 (transmission gear 51) and the synchronizer sleeve 52 that synchronize with and are joined to each other, decreases and comes close to 0.

Then, as shown in FIG. 6(5), the synchronization ends at the gear dog teeth pushing-aside stage and the in-gear stage starts, so that the synchronizer sleeve 52 is joined to the second driven transmission gear c2 (transmission gear 51) and the synchronization difference rotation ΔNs becomes 0 (timing t3 in FIG. 10).

At the in-gear stage, the shift spindle 73 and the shift drum 90 are rotated so that the sleeve teeth 52t of the synchronizer sleeve 52 may completely mesh with the gear dog teeth 51t of the transmission gear 51.

Then, the shift drum 90 reaches the first-second preliminary rotational position P12 (timing t4 in FIG. 10). Subsequently, the shift spindle 73 returns to the original neutral position tocome intoher with the master arm 74 by the torsion coil spring 79 (timing t5 in FIG. 10).

Thereafter, when the odd-stage clutch hydraulic pressure of the twin clutch 40 decreases and subsequently the even-stage clutch hydraulic pressure rises to make switching of the twin clutch 40, the rotation of the even-stage main shaft 22B to which power is transmitted is transmitted to the countershaft 23 via the meshing between the second drive transmission gear m2 and the second driven transmission gear c2 (transmission gear 51) and the joining between the second driven transmission gear c2 (transmission gear 51) and the synchronizer sleeve 52. Thus, the countershaft 23 rotates at the transmission gear ratio of second.

The position of the synchronizer sleeve 52 at which gear shift shock and a collision sound are easily caused in the above process in which the fourth driven transmission gear c4 (synchronizer sleeve 52) is moved to be joined to the driven transmission gear c2 with synchronization by the synchromesh S is the synchronization start position at the balk stage, at which the sleeve teeth 52t of the synchronizer sleeve 52 come into contact with the ring teeth 61t. In order to suppress the gear shift shock and the collision sound, the movement speed of the synchronizer sleeve 52 needs to be reduced at this synchronization start position.

However, there is variation attributed to component tolerance and the sleeve teeth 52t and the ring teeth 61t involve the progression of wear attributed to slide contact and change over the ages. Therefore, there is a problem that the synchronization start position of the synchronizer sleeve 52, at which the sleeve teeth 52t come into contact with the ring teeth 61t, also changes and it is difficult to carry out the speed reduction control of the synchronizer sleeve 52 at favorable timing. However, the present invention solves this program in the following manner.

In the present invention, attention is paid to the fact that, when the sleeve teeth 52t of the synchronizer sleeve 52 comes into contact with the ring teeth 61t, the even-stage main shaft rotational speed Nb decreases relative to the odd-stage main shaft rotational speed Na and a difference is caused in the rotational speed between both as shown in FIG. 10. Due to this, the movement position of the synchronizer sleeve 52 when a difference is caused in the rotational speed between the odd-stage main shaft 22A and the even-stage main shaft 22B is regarded as the synchronization start position of the synchronizer sleeve 52. Furthermore, the rotational position θ of the shift spindle 73 at this time is detected by the shift spindle rotational position detecting sensor 73S and is defined as the synchronization start rotational position θs of the shift spindle 73.

Then, the shift motor 71 is controlled on the basis of the synchronization start rotational position θs of the shift spindle 73.

The synchronization start position learning unit 102 in the gear shift control device 100 shown in FIG. 9 carries out control to learn the synchronization start rotational position θs of the shift spindle 73.

The synchronization start position learning unit 102 learns the synchronization start position θs through input of the rotational position θ of the shift spindle 73 detected by the shift spindle rotational position detecting sensor 73S in addition to the tarcome into gear position, the odd-stage main shaft rotational speed Na, and the even-stage main shaft rotational speed Nb. The processing procedure thereof will be described in accordance with a synchronization start position learning flowchart of FIG. 11.

First, whether or not gear shift is currently being carried out is determined in a step S1. If gear shift is not currently being carried out, the processing jumps to a step S8 to determine whether or not a rotational speed difference |Na−Nb| between the odd-stage main shaft rotational speed Na and the even-stage main shaft rotational speed Nb is smaller than a drag determination rotational speed difference Dt.

The drag determination rotational speed difference Dt is a rotational speed difference with which it can be determined that the odd-stage main shaft 22A and the even-stage main shaft 22B are in a drag state before gear shift if the rotational speed difference |Na−Nb|<Dt is satisfied. The drag determination rotational speed difference Dt is set in advance.

If it is determined that |Na−Nb|<Dt is satisfied in the step SS8, it is determined that the odd-stage main shaft 22A and the even-stage main shaft 22B are in the drag state before gear shift and the processing proceeds to a step S9 to set "1" in a pre-gear-shift drag flag Ft, followed by proceeding to a step S11. If |Na−Nb|>Dt is satisfied, it is determined that the odd-stage main shaft 22A and the even-stage main shaft 22B are not in the drag state before gear shift and the processing proceeds to a step S10 to set the pre-gear-shift drag flag Ft to "0," followed by proceeding to the step S11.

In the step S11, a synchronization start determination flag Fs is set to "0," followed by exiting from the present routine.

If it is determined that gear shift is currently being carried out in the step S1, the processing proceeds to a step S2 to determine whether or not "1" is set in the pre-gear-shift drag flag Ft. If Ft=0, the shafts are not in the drag state before gear shift and the present state is not the state in which this synchronization start position learning processing can be executed. Thus, the present routine is exited.

If it is determined that Ft=1 in the step S2, it is deemed that the shafts are in the drag state before gear shift and the processing proceeds to a step S3 to determine whether or not "1" is set in the synchronization start determination flag Fs.

At the beginning, Fs=0 is satisfied and the processing proceeds to a step S4 to determine whether or not the rotational speed difference |Na−Nb| between the odd-stage main shaft rotational speed Na and the even-stage main shaft rotational speed Nb is larger than a synchronization start determination rotational speed difference Ds.

The synchronization start determination rotational speed difference Ds is a rotational speed difference with which it can be determined that synchronization of the synchromesh S has been started if the rotational speed difference |Na−Nb|>Ds is satisfied. The synchronization start determination rotational speed difference Ds is set in advance.

If it is determined that |Na−Nb|>Ds is not satisfied in the step S4, the rotational speed difference |Na−Nb| has not yet reached the difference with which it is determined that synchronization has been started. Thus, the present routine is exited.

If it is determined that |Na−Nb|>Ds is satisfied in the step S4, it is deemed that synchronization has been started and the processing proceeds to a step S5 to set "1" in the synchronization start determination flag Fs. Subsequently, in a step S6, the shift spindle rotational position θ detected by the shift spindle rotational position detecting sensor 73S at this synchronization start timing is sampled.

More specifically, referring to FIG. 10, the shift spindle rotational position θ at the synchronization start timing (timing t2 in FIG. 10), at which it is determined that synchronization of the synchromesh S has been started on the basis of the rotational speed difference |Na−Nb| between the odd-stage main shaft rotational speed Na and the even-stage main shaft rotational speed Nb, is sampled as the synchronization start rotational position θs.

Then, in the next step S7, the average rotational position or the like of the sampled synchronization start rotational position θs of the shift spindle 73 is calculated and learning is carried out, followed by exiting from the present routine.

If it is determined that |Na−Nb|>Ds is satisfied in the step S4 and the processing proceeds through the steps S5, S6, and S7 to sample the synchronization start rotational position θs and carry out learning, "1" is set in the synchronization start determination flag Fs in the step S5. Therefore, from the next cycle, this routine is exited from the step S3.

The synchronization start rotational position θs of the shift spindle 73 learned in the synchronization start position learning unit 102 in this manner is input to the shift actuator drive unit 103 (see FIG. 9).

The shift actuator drive unit 103 executes calculation processing on the basis of the learned synchronization start rotational position θs and controls the shift motor 71.

When the shift motor 71 is driven and gear shift is started (timing t1 in FIG. 10), this shift actuator drive unit 103 controls the shift motor 71 by employing the learned synchronization start rotational position θs as the tarcome into rotational position.

Referring to FIG. 10, by controlling the shift motor 71 by employing the learned synchronization start rotational position θs as the tarcome into rotational position, the speed of the rotation of the shift spindle 73, i.e. the movement speed of the synchronizer sleeve 52, can be reduced at the synchronization start timing (timing t2 in FIG. 10). This can suppress gear shift shock and a collision sound when the sleeve teeth 52t of the synchronizer sleeve 52 collide with the ring teeth 61t.

As above, by controlling the shift motor 71 due to the learned synchronization start rotational position θs, constantly speed reduction control of the synchronizer sleeve 52 can be carried out at favorable timing to effectively reduce the gear shift shock and the collision sound without being affected by variation attributed to component tolerance and the wear of the sleeve teeth 52*t* and the ring teeth 61*t* attributed to slide contact.

Regarding the synchronization operation of the synchromesh S in shift-up from first to second, control of the shift motor 71 like the above-described one is carried out. However, regarding synchronization operation in shift-up and synchronization operation in shift-down about each of the other synchromesh S including this synchromesh S, control of the shift motor 71 like the above-described one is carried out.

In shift-up and in shift-down with each synchromesh S, the gear shift shock and the collision sound can be always effectively reduced without the influence of a variation attributed to component tolerance and the wear of the sleeve teeth 52*t* and the ring teeth 61*t* attributed to slide contact.

In the above-described control of the shift motor 71, the synchronization start rotational position of the shift spindle 73 detected by the shift spindle rotational position detecting sensor 73S at the timing at which it is determined that synchronization of the synchromesh S has been started on the basis of the rotational speed difference |Na−Nb| is detected as the synchronization start timing at which the sleeve teeth 52*t* comes into contact with the ring teeth 61*t*. However, the synchronization start rotational position of the shift drum 90 detected by the shift drum rotational position detecting sensor 90S at the timing at which it is determined that synchronization of the synchromesh S has been started may be detected as the synchronization start timing.

Furthermore, a shift fork movement position detecting sensor that detects the movement position of the shift fork 92 in the axial direction may be provided, and the synchronization start movement position of the shift fork 92 detected by the shift fork movement position detecting sensor at the timing at which it is determined that synchronization of the synchromesh S has been started may be detected as the synchronization start timing.

The twin-clutch transmission according to one embodiment of the present invention is described above. However, modes of the present invention are not limited to the above embodiment and include embodiments carried out in a variety of modes within the range of the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin-clutch transmission comprising:
    a gear change mechanism wherein an odd-stage main shaft pivotally supports drive-side transmission gears of odd stages and an even-stage main shaft pivotally supports drive-side transmission gears of even stages being disposed on a same axis line, and a countershaft that pivotally supports driven-side transmission gears that constantly mesh with the drive-side transmission gears, respectively, being disposed in parallel to the odd-stage main shaft and the even-stage main shaft;
    a twin clutch to which power is transmitted through selective connection of an odd-stage clutch that connects and disconnects power transmission between a crankshaft of an internal combustion engine and the odd-stage main shaft and an even-stage clutch that connects and disconnects power transmission between the crankshaft and the even-stage main shaft; and
    synchromesh in which ring teeth formed in a synchronizer ring are interposed between gear dog teeth formed in a first transmission gear pivotally supported relatively rotatably by at least one rotating shaft among the odd-stage main shaft, the even-stage main shaft, and the countershaft and sleeve teeth formed in a synchronizer sleeve that is a second transmission gear or a moving sleeve pivotally supported by the rotating shaft in such a manner so as to be restricted from relative rotation and be movable in axial direction, and the sleeve teeth come into contact with and mesh with the ring teeth and then come into contact and mesh with the gear dog teeth due to movement of the synchronizer sleeve and thereby the synchronizer sleeve and the first transmission gear are joined to each other while synchronizing with each other,
    a gear shift drive mechanism in which driving of an actuator is transmitted for movement of the synchronizer sleeve via a plurality of drive transmitting elements, sequentially;
    a gear shift drive displacement detecting unit that detects gear shift drive displacement of the drive transmitting element of the gear shift drive mechanism;
    an odd-stage main shaft rotational speed detecting unit that detects rotational speed of the odd-stage main shaft;
    an even-stage main shaft rotational speed detecting unit that detects rotational speed of the even-stage main shaft; and
    a control unit that executes calculation processing on a basis of an odd-stage main shaft rotational speed detected by the odd-stage main shaft rotational speed detecting unit, an even-stage main shaft rotational speed detected by the even-stage main shaft rotational speed detecting unit, and gear shift drive displacement detected by the gear shift drive displacement detecting unit, and controls the actuator;
    wherein the control unit calculates a rotational speed difference (|Na−Nb|) between the odd-stage main shaft rotational speed (Na) and the even-stage main shaft rotational speed (Nb) and learns synchronization start gear shift drive displacement (θs) detected by the gear shift drive displacement detecting unit at timing at which the rotational speed difference (|Na−Nb|) reaches a predetermined synchronization start determination rotational speed difference from gear shift start, and the control unit controls the actuator on a basis of the learned synchronization start gear shift drive displacement (θs).

2. The twin-clutch transmission according to claim 1, wherein the control unit does not carry out learning of the synchronization start gear shift drive displacement (θs) if the rotational speed difference is equal to or larger than a predetermined drag determination rotational speed difference at the time of gear shift start.

3. The twin-clutch transmission according to claim 2, wherein:
    the gear shift drive mechanism includes, as the drive transmitting elements, a shift spindle that rotates by driving of the actuator, a shift drum that rotates by rotation of the shift spindle, and a shift fork that is guided by a lead groove of the shift drum to move in the axial direction by rotation of the shift drum;

the gear shift drive mechanism is a mechanism in which the shift fork engages with the synchronizer sleeve and moves the synchronizer sleeve;

the gear shift drive displacement detecting unit is a shift spindle rotational position detecting unit that detects a rotational position of the shift spindle; and a shift spindle rotational position detected by the shift spindle rotational position detecting unit is employed as the gear shift drive displacement.

4. The twin-clutch transmission according to claim 2, wherein:

the gear shift drive mechanism includes, as the drive transmitting elements, a shift spindle that rotates by driving of the actuator, a shift drum that rotates by rotation of the shift spindle, and a shift fork that is guided by a lead groove of the shift drum to move in the axial direction by rotation of the shift drum;

the gear shift drive mechanism is a mechanism in which the shift fork engages with the synchronizer sleeve and moves the synchronizer sleeve;

the gear shift drive displacement detecting unit is a shift drum rotational position detecting unit that detects a rotational position of the shift drum; and a shift drum rotational position detected by the shift drum rotational position detecting unit is employed as the gear shift drive displacement.

5. The twin-clutch transmission according to claim 2, wherein:

the gear shift drive mechanism includes, as the drive transmitting elements, a shift spindle that rotates by driving of the actuator, a shift drum that rotates by rotation of the shift spindle, and a shift fork that is guided by a lead groove of the shift drum to move in the axial direction by rotation of the shift drum;

the gear shift drive mechanism is a mechanism in which the shift fork engages with the synchronizer sleeve and moves the synchronizer sleeve;

the gear shift drive displacement detecting unit is a shift fork movement position detecting unit that detects a movement position of the shift fork; and a shift fork movement position detected by the shift fork movement position detecting unit is employed as the gear shift drive displacement.

6. The twin-clutch transmission according to claim 1, wherein the twin-clutch transmission includes a plurality of pieces of the synchromesh, and the control unit carries out control of the actuator regarding synchronization operation of each of the synchromesh.

7. The twin-clutch transmission according to claim 2, wherein the twin-clutch transmission includes a plurality of pieces of the synchromesh, and the control unit carries out control of the actuator regarding synchronization operation of each of the synchromesh.

8. The twin-clutch transmission according to claim 3, wherein the twin-clutch transmission includes a plurality of pieces of the synchromesh, and the control unit carries out control of the actuator regarding synchronization operation of each of the synchromesh.

9. The twin-clutch transmission according to claim 4, wherein the twin-clutch transmission includes a plurality of pieces of the synchromesh, and the control unit carries out control of the actuator regarding synchronization operation of each of the synchromesh.

10. The twin-clutch transmission according to claim 1, wherein the twin-clutch transmission includes a plurality of pieces of the synchromesh, and the control unit carries out control of the actuator regarding respective synchronization operation in shift-up and synchronization operation in shift-down about each of the synchromesh.

11. The twin-clutch transmission according to claim 2, wherein the twin-clutch transmission includes a plurality of pieces of the synchromesh, and the control unit carries out control of the actuator regarding respective synchronization operation in shift-up and synchronization operation in shift-down about each of the synchromesh.

12. The twin-clutch transmission according to claim 3, wherein the twin-clutch transmission includes a plurality of pieces of the synchromesh, and the control unit carries out control of the actuator regarding respective synchronization operation in shift-up and synchronization operation in shift-down about each of the synchromesh.

13. The twin-clutch transmission according to claim 4, wherein the twin-clutch transmission includes a plurality of pieces of the synchromesh, and the control unit carries out control of the actuator regarding respective synchronization operation in shift-up and synchronization operation in shift-down about each of the synchromesh.

14. The twin-clutch transmission according to claim 5, wherein the twin-clutch transmission includes a plurality of pieces of the synchromesh, and the control unit carries out control of the actuator regarding respective synchronization operation in shift-up and synchronization operation in shift-down about each of the synchromesh.

* * * * *